Figure 1:
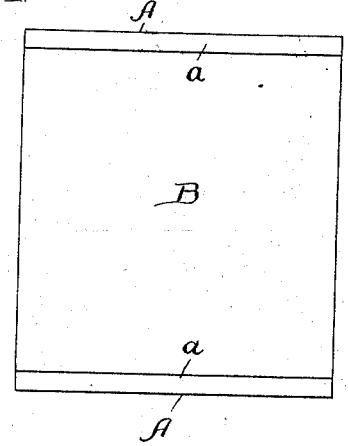

(No Model.)

J. LEE.
SHEET METAL CAN AND ART OF MANUFACTURING SAME.

No. 518,548. Patented Apr. 17, 1894.

Witnesses:
Geo. E. Curtis
A. M. Munday

Inventor:
John Lee
By Munday, Evarts & Adcock,
His Attorneys

THE NATIONAL LITHOGRAPHING COMPANY,
WASHINGTON, D. C.

UNITED STATES PATENT OFFICE.

JOHN LEE, OF SAN MATEO, CALIFORNIA.

SHEET-METAL CAN AND ART OF MANUFACTURING SAME.

SPECIFICATION forming part of Letters Patent No. 518,548, dated April 17, 1894.

Application filed August 21, 1893. Serial No. 483,629. (No model.)

*To all whom it may concern:*

Be it known that I, JOHN LEE, of San Mateo, in the county of San Mateo and State of California, have invented certain Improvements in Sheet-Metal Cans and Art of Manufacturing the Same, of which the following is a specification.

My invention relates to cans made of tin plate and designed to be hermetically sealed and used for preserving fruit, fish, vegetables and other articles and to the art or method of manufacturing the same. Heretofore such cans have usually comprised a cylindrical body and two disks constituting the two heads, or the top and bottom of the can, each having a short-cylindrical flange fitting outside the can body. And in order that the frictional or slip-joint fit, between the can head and body, may serve to retain the head in place until it is soldered fast and during the soldering operation, as well as to enable a perfect soldered seam to be formed between the head and body it is necessary that the head shall fit very snugly and tightly upon the body. This renders the manufacture of these cans a slow and difficult operation especially if the heads are applied by hand, and requires complicated, and expensive machinery operating with great accuracy if it is attempted to apply the heads by automatic machinery. In addition to this the shoulder formed upon the surface of the can body by the raw edge of the can head flange forms a place where the solder is liable to lodge and remain in a wasteful and unnecessary accumulation, and which also detracts from the neat appearance of the can.

The object of my invention is to overcome these defects or difficulties by a novel and improved construction of the can and thus greatly simplify the method of applying the tight exteriorly fitting heads thereto.

My improved can comprises two heads or flanged disks of the usual or ordinary construction now commonly in use in fruit or other hermetically sealed cans, combined with a can body made of two diameters differing by the thickness of the tin of the can head flange. The larger diameter of the can body is thus flush with the exterior surface of the can head flange, while the smaller diameter of said body corresponds to the interior diameter of the can head. The portion of the can body made of this smaller diameter is located at the ends of the body and is in length preferably equal to the width or depth of the can head flange so that when the head is applied the edge of the can head flange may fit snugly against the offset in the can body. The portion of the body between the offsets may preferably be uniformly of the larger diameter throughout. This construction leaves the whole cylindrical surface of the can, heads and all, of one smooth and uniform size or diameter, and no shoulder is left for wasteful and disfiguring accumulation of solder. And it also enables the head to be easily applied by the simplest mechanism, as any sizing and rounding device applied to the larger diameter of the body will also serve to center the head in line with the body and thus adapt the smaller diameter of the body to enter within the flange of the head by a straight movement, because the two diameters of the body as above stated differ by the thickness of tin in the can head flange.

Figure 2:
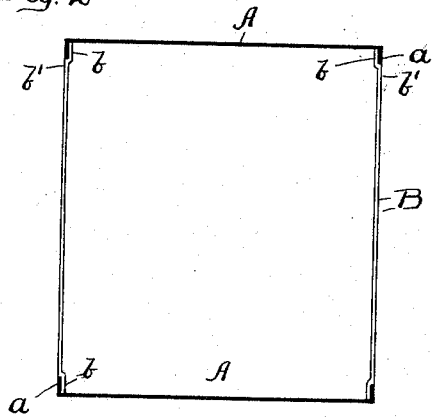
Figure 3:
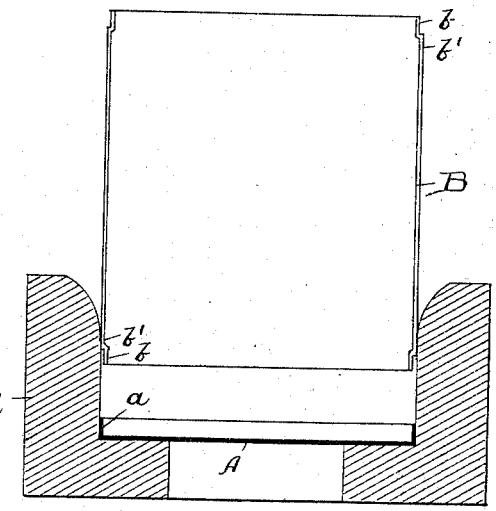

In the accompanying drawings forming a part of this specification, Figure 1, is a side elevation of a can embodying my invention. Fig. 2 is a sectional view of the same; and Fig. 3 illustrates the operation or function of the two diameters of the can body in applying the head to the body.

In the drawings A, A, are the two heads of the can each having a short and approximately cylindrical flange *a*.

B is the can body, the same having, preferably at each end, a portion *b*, of a size or diameter corresponding to the interior diameter of the can head flange *a*, and preferably in length about equal to the depth of said flange. The body B., also has a portion *b'* of a larger diameter corresponding to the exterior diameter of the can head flange, the two diameters of the body thus differing substantially by the thickness of the tin.

C., is a ring or device whose interior diameter is the same as the exterior diameter of the can head. In the bottom of this ring the head may be dropped or placed as illustrated in Fig. 3., and then as the can body is pushed into the ring the portion of the can body of the larger diameter *b'* by contact with the inner cylindrical wall of the ring will be sized and brought to a true circle so that its smaller diameter $b$, will be adapted to enter truly the flange of the head which is also held accurately in position to receive it as the head and body are pushed together with a straight movement.

It will of course be understood that the offset between the two diameters of the can is very slight as the tin is ordinarily only about one sixty fourth of an inch in thickness and it will therefore offer no obstruction to the filling or emptying of the can. In the drawings the thickness of the stack is exaggerated for clearness, making the offset appear larger than in the actual can.

I claim—

1. The sheet metal can herein shown and described for hermetically sealed goods, comprising in combination, a head A, having integral flange $a$, and a body B, having a circumferential portion $b$ and a circumferential portion $b'$, the two differing in size by the thickness of the tin in said can head flange, the portion $b$ of the can body corresponding in diameter to the interior diameter of the can head flange, and the largest portion $b'$ of the can body corresponding in diameter to the greatest exterior diameter of the can head, whereby the can body is adapted to be sized and rounded and the can head centered and aligned with the body in the heading of the can in a plain cylindrical heading device or ring, the can head flange fitting outside the can body on the end thereof and having a frictionally tight fit therewith, substantially as specified.

2. The sheet metal can herein shown and described for hermetically sealed goods comprising in combination two heads A A made from separate disks, and having each an integral flange $a$; and a body B made in a separate piece from each of said heads, and having a circumferential portion $b$ and a circumferential portion $b'$ the two differing in size by the thickness of the tin in said can head flanges, the portion $b$ of the can body corresponding in diameter to the interior diameter of the can head flange, and the largest portion $b'$ of the can body corresponding in diameter to the greatest exterior diameter of the can heads, whereby the can body is adapted to be sized and rounded and the can head centered and aligned with the body in the heading of the can in a plain cylindrical heading device or ring, the can head flanges fitting outside the can body on the ends thereof and having each a frictionally tight fit therewith, substantially as specified.

3. The improvement in the manufacture of sheet metal cans having exterior tight fitting heads, which consists in forming a can body of sheet metal with two circumferential portions $b$ and $b'$, differing in size by the thickness of the tin in the flange of the can head, the portion $b$ corresponding in diameter to the interior diameter of the can head flange, and the portion $b'$ to the exterior diameter of the can head, placing the can head and can body in a suitable ring or heading device of an interior diameter corresponding to the exterior diameter of the can head, and serving to center the head in line with the body and to size and round the body, and then forcing the head and body together and removing the headed can from the heading device, substantially as specified.

4. The improvement in the art of applying exterior tight fitting heads to can bodies, which consists in taking the can body having two cylindrical portions $b$ and $b'$, differing in size by the thickness of the tin in the can head flange, placing such can body and the can head within a ring or device corresponding in size or diameter to the exterior diameter of the can head, the exterior pressure of said ring or device on the larger portion $b'$ of the can body serving to size and round the smaller portion $b$ thereof, to adapt it to correspond to and enter the interior of the can head flange while the same is centered in line with the body by said ring or heading device, and then forcing the head and body together and removing the headed can from the heading device, substantially as specified.

JOHN LEE.

Witnesses:
JOHN W. MUNDAY,
EDMUND ADCOCK.